US010683810B2

(12) United States Patent
Darby et al.

(10) Patent No.: US 10,683,810 B2
(45) Date of Patent: Jun. 16, 2020

(54) SHAFT SHEAR DETECTION FOR GAS TURBINE ENGINES (71) Applicant: PRATT & WHITNEY CANADA CORP., Longueuil (CA)

(72) Inventors: Michael Darby, Candiac (CA); Reza Pedrami, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 252 days.

(21) Appl. No.: 15/829,145

(22) Filed: Dec. 1, 2017

(65) Prior Publication Data

US 2019/0170068 A1 Jun. 6, 2019

(51) Int. Cl.
*F02C 9/00* (2006.01)
*F02C 9/28* (2006.01)
*G01B 21/32* (2006.01)
*F01D 21/04* (2006.01)
*F01D 21/06* (2006.01)
*F02D 35/02* (2006.01)
*F16C 3/02* (2006.01)
*G01B 7/16* (2006.01)

(52) U.S. Cl.
CPC ............. *F02C 9/28* (2013.01); *F01D 21/045* (2013.01); *F01D 21/06* (2013.01); *G01B 21/32* (2013.01); *F02D 35/02* (2013.01); *F05D 2260/80* (2013.01); *F16C 3/02* (2013.01); *F16C 2233/00* (2013.01); *F16C 2360/23* (2013.01); *G01B 7/16* (2013.01)

(58) Field of Classification Search
USPC .......................................................... 701/100
See application file for complete search history.

(56) References Cited

U.S. PATENT DOCUMENTS

| 4,833,405 | A | 5/1989 | Richards et al. |
| 6,176,074 | B1 | 1/2001 | Thompson et al. |
| 6,607,349 | B2 | 8/2003 | Mulera et al. |
| 9,169,742 | B2 | 10/2015 | Dooley et al. |
| 2003/0091430 | A1 | 5/2003 | Mulera et al. |
| 2010/0219987 | A1 | 9/2010 | Isom et al. |
| 2011/0213537 | A1* | 9/2011 | Dooley ................. F01D 21/045 701/100 |
| 2014/0121934 | A1 | 5/2014 | Dooley |
| 2016/0178464 | A1* | 6/2016 | Burns ...................... F02C 3/10 73/112.01 |
| 2017/0030215 | A1 | 2/2017 | Kulczyk |
| 2017/0205312 | A1 | 7/2017 | Heyerman et al. |
| 2018/0045071 | A1 | 2/2018 | Roach et al. |

* cited by examiner

*Primary Examiner* — James M McPherson
(74) *Attorney, Agent, or Firm* — Norton Rose Fulbright Canada LLP (57) ABSTRACT

A system and a method for detecting a shaft shear event in a gas turbine engine are disclosed. The system comprises a sensor configured to detect a shaft shear force exerted by a shaft on a support structure supporting the shaft where the shaft shear force is indicative of shearing of the shaft. The system also comprises a controller operatively coupled to the sensor and configured to initiate a shutdown of the gas turbine engine in response to the detection of the shaft shear force by the sensor.

28 Claims, 6 Drawing Sheets

SHAFT SHEAR DETECTION FOR GAS TURBINE ENGINES

TECHNICAL FIELD

The disclosure relates generally to gas turbine engines, and more particularly to detecting a shaft shear event in a gas turbine engine.

BACKGROUND OF THE ART

Shearing of a spool shaft of a gas turbine engine is an event that should be detected as quickly as possible. Conventional systems for shaft shear detection in gas turbine engines typically rely on a rotational speed change or a position change of the spool to identify the shaft shear event. Conventional systems for shaft shear detection can require a significant amount of time to identify the shaft shear event. Improvement is desirable.

SUMMARY

In one aspect, the disclosure describes a system for detecting a shaft shear event in a gas turbine engine having a turbine supported by a shaft. The system comprises:

a sensor configured and located to detect a shaft shear force exerted by the shaft on a support structure of the engine, the shaft shear force being indicative of shearing of the shaft; and a controller operatively coupled to the sensor and configured to initiate a shutdown of the gas turbine engine in response to the detection of the shaft shear force by the sensor.

The shaft shear force may comprise a predetermined change in axial force exerted by the shaft of the gas turbine engine on the support structure as a function of time.

The predetermined change in force may comprise a 50% increase in the axial force exerted by the shaft of the gas turbine engine on the support structure in a predetermined period of time.

The sensor may comprise a load cell disposed in a load path between the shaft of the gas turbine engine and the support structure.

The sensor may comprise a load cell disposed in a load path between a thrust bearing supporting the shaft of the gas turbine engine and the support structure.

The sensor may comprise a strain gauge configured to detect a strain of the support structure in response to the shaft shear force exerted by the shaft of the gas turbine engine on the support structure.

Embodiments can include combinations of the above features.

In another aspect, the disclosure describes a gas turbine engine comprising:

a shaft having a first portion in torque-transmitting engagement with a load, and a second portion in torque-transmitting engagement with a turbine; and a sensor configured and located to detect a shaft shear force exerted by the shaft on a support structure supporting the shaft, the shaft shear force being indicative of shearing of the shaft at a location axially between the first and second portions of the shaft; and a controller operatively coupled to the sensor and configured to initiate a shutdown of the gas turbine engine in response to the detection of the shaft shear force by the sensor.

The shaft shear force may comprise a predetermined change in axial force exerted by the shaft of the gas turbine engine on the support structure as a function of time.

The predetermined change in force may comprise a 50% increase in the axial force exerted by the shaft of the gas turbine engine on the support structure in a predetermined period of time.

The sensor may comprise a load cell disposed in a load path between the shaft of the gas turbine engine and the support structure.

The sensor may comprise a load cell disposed in a load path between a thrust bearing supporting the shaft of the gas turbine engine and the support structure.

The sensor may comprise a strain gauge configured to detect a strain of the support structure in response to the shaft shear force exerted by the shaft of the gas turbine engine on the support structure.

Embodiments can include combinations of the above features.

In another aspect, the disclosure describes a method for detecting a shaft shear event in a gas turbine engine. The method comprises:

detecting a shaft shear force exerted by a shaft of the gas turbine engine on a support structure supporting the shaft, the shaft shear force being indicative of shearing of the shaft; and initiating a shutdown of the gas turbine engine in response to the detection of the shaft shear force.

Detecting the shaft shear force may comprise detecting a predetermined change in axial force exerted by the shaft of the gas turbine engine on the support structure as a function of time.

The predetermined change in force may comprise a 50% increase in the axial force exerted by the shaft of the gas turbine engine on the support structure in a predetermined period of time.

The method may comprise detecting the shaft shear force using a load cell disposed in a load path between a thrust bearing supporting the shaft of the gas turbine engine and the support structure.

The method may comprise detecting the shaft shear force by detecting a strain of the support structure in response to the shaft shear force exerted by the shaft of the gas turbine engine on the support structure.

Embodiments can include combinations of the above features.

In another aspect, the disclosure describes a system comprising:

a sensor configured and located to detect a force exerted by a shaft of a gas turbine engine on a support structure of the gas turbine engine supporting the shaft; and a controller operatively coupled to the sensor and configured to initiate a control function associated with the gas turbine engine in response to the detection of the force by the sensor.

The force may comprise an axial force exerted by the shaft of the gas turbine engine on the support structure.

The force may be indicative of an operation of a feathering system for a propeller coupled to the gas turbine engine.

The control function may comprise an adjustment of a thrust or power setting of the gas turbine engine.

The force may comprise a change in axial force exerted by the shaft of the gas turbine engine on the support structure. The change in axial force may be indicative of an occurrence of damage to a fan coupled to the shaft. The control function may comprise an adjustment of a thrust or power setting of the gas turbine engine.

The sensor may comprise a load cell disposed in a load path between the shaft of the gas turbine engine and the support structure.

The sensor may comprise a load cell disposed in a load path between a thrust bearing supporting the shaft of the gas turbine engine and the support structure.

The sensor may comprise a strain gauge configured to detect a strain of the support structure in response to the shaft shear force exerted by the shaft of the gas turbine engine on the support structure.

Embodiments can include combinations of the above features.

In another aspect, the disclosure describes a method comprising:

detecting a force exerted by a shaft of the gas turbine engine on a support structure of the gas turbine engine supporting the shaft; and initiating a control function associated with the gas turbine engine in response to the detection of the force.

The force may comprise an axial force exerted by the shaft of the gas turbine engine on the support structure.

The force may be indicative of an operation of a feathering system for a propeller coupled to the gas turbine engine.

The control function may comprise an adjustment of a thrust or power setting of the gas turbine engine.

The force may comprise a change in axial force exerted by the shaft of the gas turbine engine on the support structure. The change in axial force may be indicative of an occurrence of damage to a fan coupled to the shaft. The control function may comprise an adjustment of a thrust or power setting of the gas turbine engine.

The force may comprise an axial force in a load path between the shaft of the gas turbine engine and the support structure.

The force may comprise an axial force in a load path between a thrust bearing supporting the shaft of the gas turbine engine and the support structure.

The method may comprise detecting the force by detecting a strain of the support structure in response to the force exerted by the shaft of the gas turbine engine on the support structure.

Embodiments can include combinations of the above features.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The following description relates to a system and a method for detecting and mitigating a shaft shear event in a gas turbine engine such as turbofan, turboshaft, and turboprop engines that can be configured for use in aircraft applications for example. The system can comprise a sensor configured to detect a shaft shear force exerted by a shaft of the gas turbine engine on a support structure supporting the shaft where the shaft shear force is indicative of shearing of the shaft. A controller of the system can initiate a shutdown of the gas turbine engine or initiate some other mitigating action in response to the detection of the shaft shear event by the (e.g., force) sensor. In comparison with other shaft shear detection methods, the identification of the shaft shear force as disclosed herein can be achieved relatively quickly and in a reliable manner so that an appropriate mitigating action such as an engine shut down can also be initiated relatively quickly.

Aspects of various embodiments are described through reference to the drawings.

Figure 1:
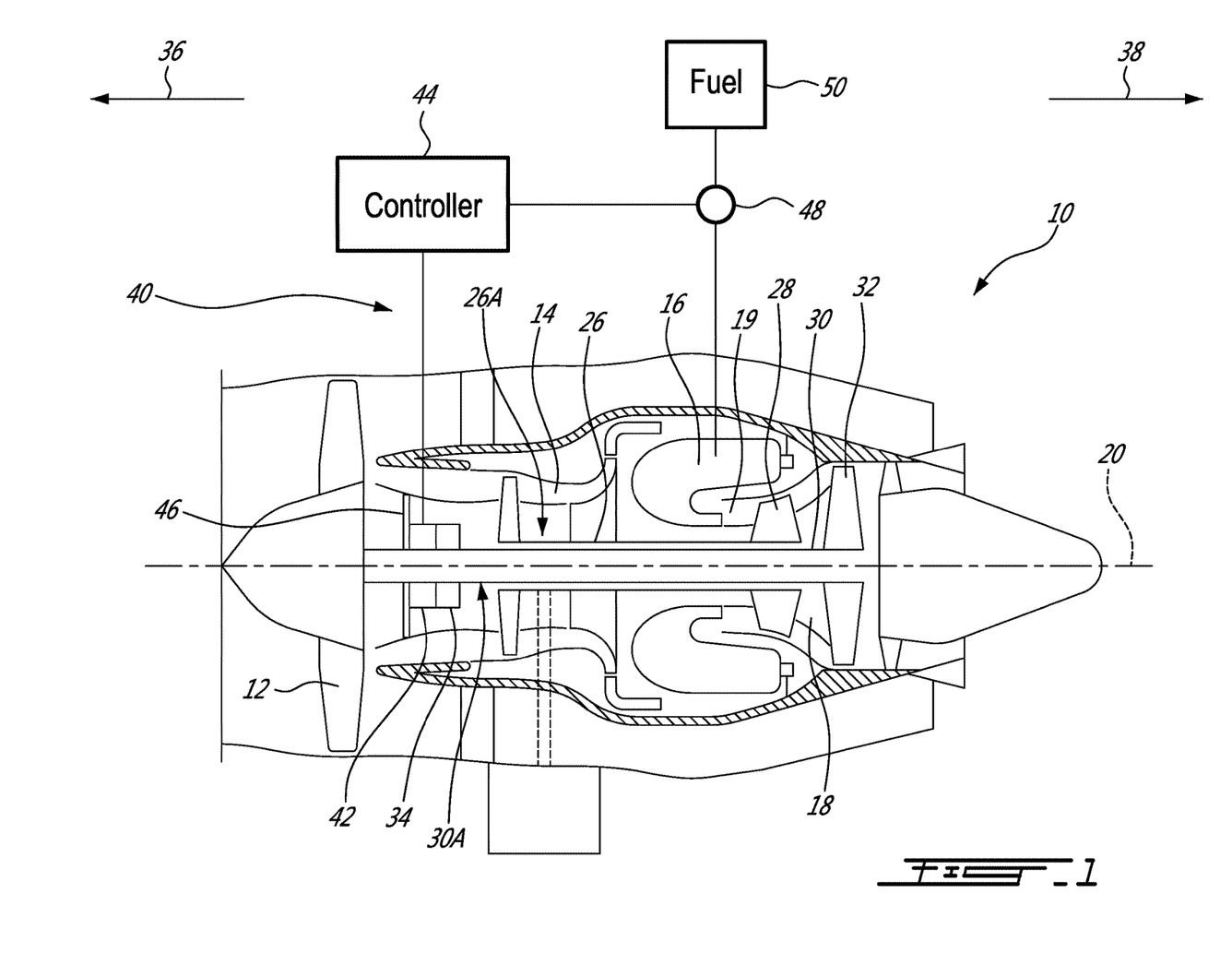
FIG. 1 is a schematic axial cross-sectional view of an exemplary gas turbine engine comprising a system for detecting a shaft shear event as disclosed herein.

FIG. 1 is a schematic axial cross-section view of an exemplary gas turbine engine 10 comprising a system for detecting a shaft shear event as described herein. Gas turbine engine 10 may be of a type preferably provided for use in subsonic flight, generally comprising, in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. In some embodiments, gas turbine engine 10 may be suitable for mounting to and propelling an (e.g., fixed-wing or rotary wing) aircraft. Alternatively, gas turbine engine 10 may be configured as an auxiliary power unit (APU) for use on an aircraft, or, gas turbine engine 10 may be used for a ground-based industrial application such as power generation.

The engine 10 can include one of more shafts 26A, 30A for transmitting torque from one component to another component. The longitudinal axis 20 of rotation of the shaft 26A, 30A may define a central axis of the gas turbine engine 10. In various embodiments, gas turbine engine 10 may have a dual-spool configuration but it is understood that gas turbine engine 10 may not be limited to such configuration. For example, gas turbine engine 10 may comprise a high-pressure spool 26 including one or more stages of multistage compressor 14 (i.e., load) in torque-transmitting engagement with one or more high-pressure turbines 28 of turbine section 18 via high-pressure shaft 26A. Gas turbine engine 10 may also comprise a low-pressure spool 30 including fan 12 (i.e., load) in torque-transmitting engagement with one or more low-pressure (i.e. power) turbines 32 of turbine section 18 via low-pressure shaft 30A. High-pressure shaft 26A and low-pressure shaft 26B may be coaxial so as to have a common rotational axis 20.

Gas turbine engine 10 may comprise one or more bearings 34 (referred hereinafter in the singular) suitable for rotatably supporting the low-pressure shaft 30A or the high-pressure shaft 26A for rotation about the rotational axis 20 or some other axis. The bearing 34 may be a suitable thrust bearing capable of supporting at least some axial load exerted by the low-pressure shaft 30A or the high-pressure shaft 26A relative to the support structure 46. In relation to the low-pressure spool 30, the fan 12 and the low-pressure turbine 32 may be axially separated by an axial distance and the bearing 34 may be disposed axially between the fan 12 and the low-pressure turbine 32. In various embodiments, it is understood that the bearing 34 could be located at any suitable location and not necessarily between the fan 12 and the low-pressure turbine 32.

Even though aspects of this disclosure associated with shaft shear detection are illustrated and explained below in relation to the low-pressure shaft 30A, it is understood that aspects of this disclosure are equally applicable to the high-pressure shaft 26A. Also, the terms "shear" and "shearing" as used herein are not intended to be indicative of a specific failure mode of a shaft. The terms are intended to encompass breaks or other structural failures of a shaft of the gas turbine engine 10 where an immediate detection and mitigating action are desirable.

Gas turbine engine 10 may comprise a support structure 46 for supporting the low-pressure shaft 30A. The support structure 46 may comprise or be mounted to another component of the engine 10, such as a casing of the engine 10. The low-pressure shaft 30A may be coupled to a rotating race of the bearing 34, and a stationary race of the bearing 34 may be coupled to the support structure 46 either directly or indirectly. Accordingly, a force applied to or acting on the low-pressure shaft 30A may be transmitted to the support structure 46 via the bearing 34. In other words, the bearing 34 may be disposed in a load path between the low-pressure shaft 30A and the support structure 46. In some embodiments, the bearing 34 can be configured to transmit radial and axial forces between the low-pressure shaft 30A and the support structure 46.

The engine 10 may have a generally forward direction represented by the arrow 36 and a generally aft direction represented by the arrow 38. The forward direction 36 may be the typical direction of movement of the engine 10 when in use on an aircraft in flight.

A shaft shear event in a gas turbine engine may be caused by fatigue or wear for example. A shaft shear event is typically considered a critical event that requires immediate shutdown of the engine 10, to prevent further damage to the engine 10 or to the aircraft (e.g., to prevent over-speeding of the turbine and a turbine burst). As explained below, when an engine shaft shear event occurs, it has been found that a force exerted by the low-pressure shaft 30A on the support structure 46 can have a distinct signature that can be detected and used to identify the shaft shear event. For example, when a shaft shear event occurs, the axial force exerted by the low-pressure shaft 30A on the support structure 46 can exhibit a sudden/sharp increase in magnitude.

The gas turbine engine 10 may comprise a system 40 for detecting a shaft shear event and initiating an appropriate action immediately upon such detection. The system 40 can comprise a sensor 42 and a controller 44. The sensor 42 of the system 40 may be configured to detect a (e.g., axial) force exerted by the low-pressure shaft 30A of the gas turbine engine 10 on the support structure 46 supporting the low-pressure shaft 30A. In some embodiments, the sensor 42 may be configured to detect a shaft shear force exerted by the low-pressure shaft 30A on the support structure 46. The shaft shear force may be indicative of shearing of the low-pressure shaft 30A of the gas turbine engine 10. The shaft shear force may be a generally axial force exerted by the low-pressure shaft 30A on the support structure 46 along the axis 20 of rotation the low-pressure shaft 30A.

The sensor 42 can comprise any suitable transducer(s) used to produce an electrical signal that is indicative of (e.g., proportional to) the force being measured. In various embodiments, the sensor 42 can comprise a suitable load cell (e.g., hydraulic load cell, pneumatic load cell or strain gauge load cell) disposed in a load path between the (e.g., thrust) bearing 34 rotatably supporting the low-pressure shaft 30A, and the support structure 46. For example, the sensor 42 can be sandwiched between the bearing 34 and the support structure 46.

As depicted in FIG. 1, the support structure 46, sensor 42, and bearing 34 can be positioned in a forward portion of low-pressure shaft 30A, axially closer to the fan 12 than the to the turbine section 18. The support structure 46 can be positioned forward of the sensor 42 and the sensor 42 can be positioned forward of the bearing 34. This relative positioning of the support structure 46, sensor 42, and bearing 34 may be appropriate for detecting a shaft shear force exerted by the low-pressure shaft 30A on the support structure 46 in a forward direction.

Alternatively or in addition, the arrangement of the support structure 46, sensor 42, and bearing 34 may be disposed in an aft portion of the low pressure shaft 30A, closer to low-pressure turbine 32 with the bearing 34 positioned forward of the sensor 42, and the sensor 42 positioned forward of the support structure 46. This relative positioning of the bearing 34, sensor 42, and support structure 46 may be appropriate for detecting a shaft shear force exerted by the low-pressure shaft 30A on the support structure 46 in an aft direction. It is understood that the sensor 42 may be configured to detect the force exerted by the low-pressure shaft 30A in a forward and/or aft direction. For example, it is understood that the sensor 42 may be installed and configured to measure a tensile force or a compressive force.

The sensor 42 may be configured to detect a shaft shear force that matches a predetermined signature (e.g., equals or exceeds a predetermined amount/threshold). The sensor 42 may be operatively coupled to the controller 44 so that the controller 44 may be provided with signals produced at least in part using the sensor 42. In some embodiments, the sensor 42 may be configured to produce a signal only when the predetermined force signature has been detected. Alternatively, the sensor 42 may be configured to continuously or intermittently produce a signal indicative of the force in the load path between the low-pressure shaft 30A and the support structure 46 and the determination of whether the force matches the predetermined signature indicative of a shaft shear event can be made by the controller 44. In some embodiments, signals produced using a plurality of sensors 42 may be used by the controller 44 for redundancy and/or confirmation of the shaft shear event before initiating a shutdown of the gas turbine engine 10.

Upon detection of the shaft shear event, the controller 44 may in turn immediately initiate a mitigating action such as the shutdown of the gas turbine engine 10. The shutdown of the gas turbine engine 10 may be initiated at least in part by cutting off the fuel flow to the combustor 16 for example. Accordingly, controller 44 may be operatively coupled to close one or more fuel valves 48 disposed between the combustor 16 and the fuel supply 50.

In some embodiments, the controller 44 may comprise one or more digital computer(s) or other data processors, sometimes referred to as electronic engine controller(s) (EEC) and related accessories that control at least some aspects of performance of the engine 10. Accordingly, the controller 44 may be part of a Full Authority Digital Engine Control, sometimes also referred to as "FADEC" of the gas turbine engine 10. The controller 44 may be configured to make decisions regarding the operation of the engine 10. The controller 44 may include one or more data processors, microcontrollers or other suitably programmed or programmable logic circuits. The controller 44 may be dedicated to shaft shear detection or may be configured to carry out other tasks as well.

The controller 44 may also comprise memory(ies) and memory data devices or register(s). Such memory(ies) may comprise any (e.g., non-transitory) computer-readable storage means (e.g. devices) suitable for retrievably storing machine-readable instructions executable by one or more processors of the controller 44. Such machine-readable instructions may cause the controller 44 to conduct operations associated with various methods disclosed herein or part(s) thereof. For example, such machine-readable instructions may cause the controller 44 to generate output(s) that may serve to command actions associated with the methods disclosed herein. Such machine-readable instructions may be embodied as a computer program product having computer readable program code executable by one or more processors of the controller 44.

Figure 2:
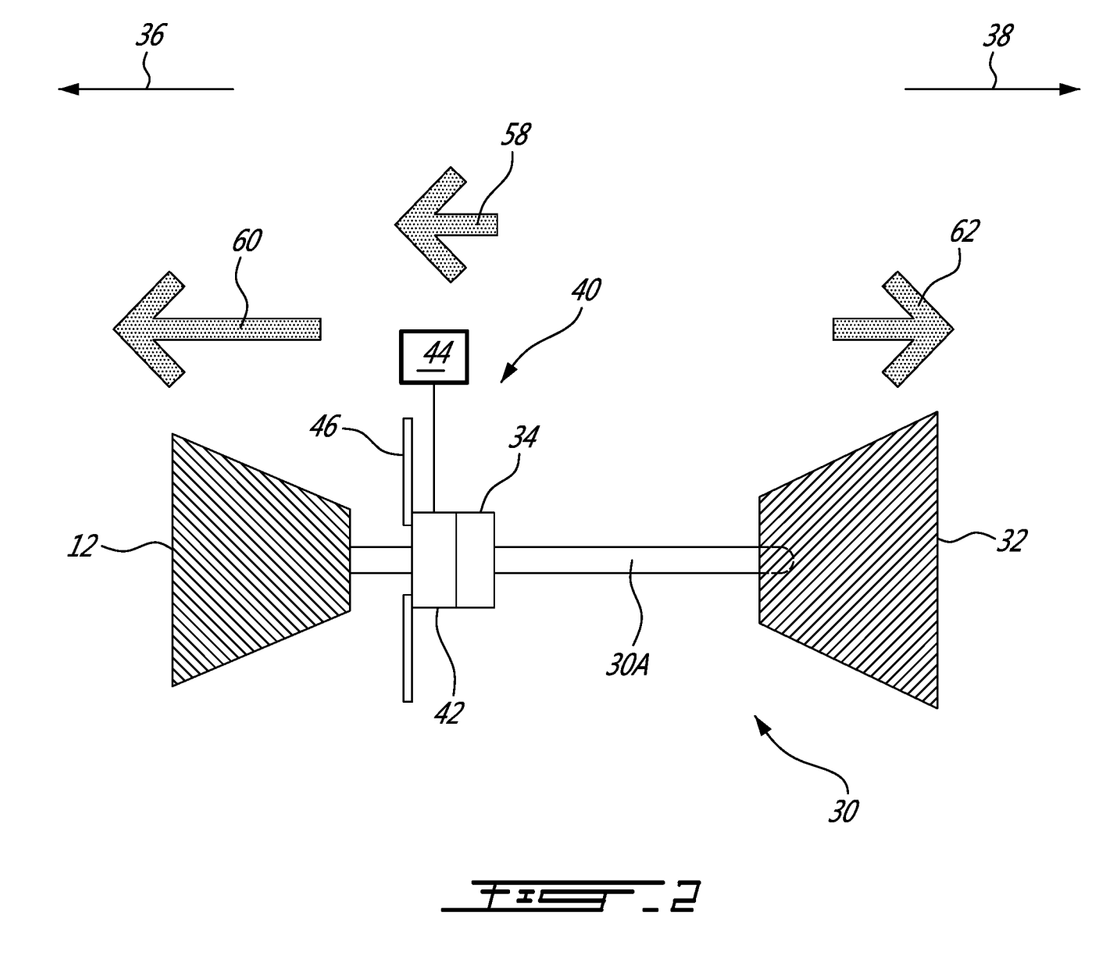
FIG. 2 is a schematic view of a spool of the gas turbine engine of FIG. 1 during normal operation.

FIG. 2 is a schematic view of the low-pressure spool 30 of the gas turbine engine 10 during normal operation. In reference to FIG. 2, the forces expected to be exerted by the low-pressure shaft 30A on the support structure 46 during normal operation can be predetermined. Also, the force signature that is representative of a shaft shear event may be predetermined based on specifications and characteristics of the engine 10 so that a force signature indicative of the shaft shear event can be distinguished from forces exerted during normal or other known non-normal operating conditions.

The low-pressure shaft 30A has a first (e.g., forward) portion in torque-transmitting engagement with load (e.g., fan 12), and a second (e.g., aft) portion in torque-transmitting engagement with the low-pressure turbine 32. As depicted in FIG. 2, the sensor 42 can be disposed in the load path and between the bearing 34 and the support structure 46. The force exerted by the low-pressure shaft 30A on the support structure 46 may be a net or resultant force 58 that may depend on other forces exerted by components of the engine 10 on the low-pressure shaft 30A. For example, during normal operation of the engine 10, the low-pressure turbine 32 is driven by combustion gases and applies a torque on the low-pressure shaft 30A to drive the fan 12 which propels ambient air through the engine 10 in the aft direction 38. Accordingly, the fan 12 exerts a forward force 60 on the low-pressure shaft 30A and the turbine 32 exerts an aft force 62 on the low-pressure shaft 30A so that a portion of the low-pressure shaft 30A that is disposed axially between the fan 12 and the low-pressure turbine 32 is in tension.

In some situations, the forward force 60 and the aft force 62 applied to the low-pressure shaft 30A may be of unequal magnitudes resulting in an axial force unbalance on the low-pressure shaft 30A. For example, as represented by the different respective lengths of arrows 58, 60 and 62, the forward force 60 may be greater than the aft force 62 so that a net forward force 58 is applied to the low-pressure shaft 30A during normal operation. The net force 58 may be a vector sum of the forces exerted on the low-pressure shaft 30A including the forces 60 and 62. The net force 58 may vary with operating conditions such as with engine power or thrust settings and such variations can be relatively gradual during normal operation. The net forward force 58 can be transmitted to the support structure 46 via the bearing 34, which may be a thrust bearing having a stationary race coupled to the support structure 46 and a rotating race coupled to the low-pressure shaft 30A. Other bearings (not shown), may be present to support the low-pressure shaft 30A at different axial locations.

Figure 3:
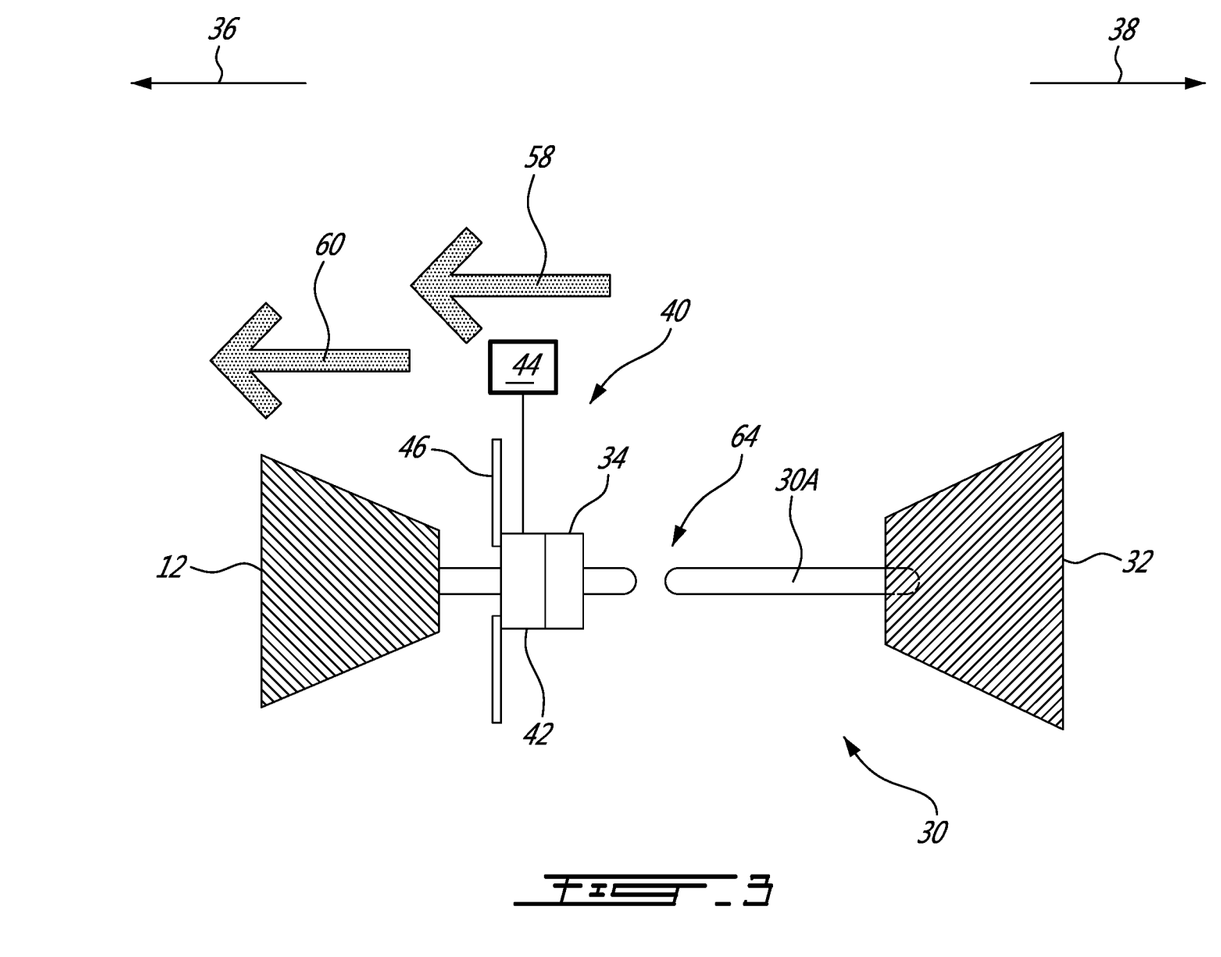
FIG. 3 is a schematic view of the spool of FIG. 2 following a shaft shear event where the system includes a load cell.

FIG. 3 is a schematic view of the low-pressure spool 30 of the gas turbine engine 10 immediately following a shaft shear event where a break 64 is present in the low-pressure shaft 30A. As depicted, the low-pressure shaft 30A has sheared such that the fan 12 and the low-pressure turbine 32 are no longer in torque-transmitting engagement via the low-pressure shaft 30A. Immediately following the shaft shear event, the fan 12 still propels air in the aft direction 38 so as to produce the forward force 60 on the forward portion of the low-pressure shaft 30A that is supported by the bearing 34. However, since the aft portion of the low-pressure shaft 30A is now disconnected from the forward portion of the low-pressure shaft 30A, the aft force 62 is no longer exerted at the bearing 34. The removal of the aft force 62 from the bearing 34 results in a sudden/sharp increase of the net force 58 that is applied to the bearing 34. In FIG. 3, the arrows 58 and 60 are shown as having substantially equal lengths to indicate that the net force 58 is substantially equal to the forward force 60 at the time immediately following the shaft shear event due at least in part to the inertia of the fan 12 and the forward portion of low-pressure shaft 30A. It is understood that due to the shearing of the low-pressure shaft 30A, the low-pressure turbine 32 would no longer be driving fan 12 and the rotational speed of the fan 12 would decrease following the shaft shear event.

After the shaft shear event and prior to shutting down the gas turbine engine 10, the low-pressure turbine 32 would continue to be driven by the expanding combustion gasses and consequently continue to apply the aft force 62 and torque to the aft portion of the low-pressure shaft 30A. Since the load (e.g., fan 12) is no longer acting on the aft portion of the low-pressure shaft 30A, the speed of the low-pressure turbine 32 could potentially increase greatly and rapidly, which could cause damage to the gas turbine engine 10 if no mitigating action is taken following the shaft shear event. Shutting down fuel flow to the combustor 16 (e.g., via valve 48) in response to the detection of the shaft shear force using the sensor 42 could limit or prevent such significant speed increase and potential burst of the low-pressure turbine 32.

Figure 4:
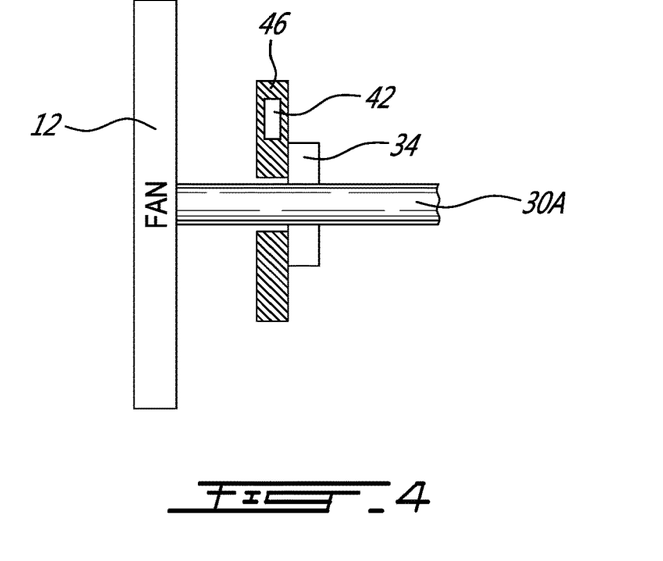
FIG. 4 is a schematic view of a forward portion of the spool of FIG. 2 where the system includes a strain gauge.

FIG. 4 is a schematic view of a forward portion of the low-pressure spool 30 of the gas turbine engine 10 where the sensor 42 is a strain gauge mounted to a structural component on which at least part of the (e.g., axial) force exerted by the low-pressure shaft 30A is exerted. For example, such strain gauge could be coupled to the support structure 46 to detect a strain of the support structure 46 in response to the shaft shear force. The strain detected by the sensor 42 could be calibrated to be indicative of the shaft shear force and used by the controller 44 in the same manner as explained above. It is understood that a plurality of strain gauges mounted on the same or different components could be operatively connected to the controller 44 for redundancy and/or confirmation of the shaft shear event before initiating a shutdown of the gas turbine engine 10. It is understood that a combination of one or more strain gauges and one or more load cells could be used as sensors 42 and be operatively connected to the controller 44 to provide redundancy and robustness in the identification of the shaft shear event. For example, a suitable arrangement of sensors 42 could include a strain gauge mounted to the support structure 46 and a load cell sandwiched between the bearing 34 and the support structure 46. In various embodiments, the strain gauge(s) may be configured to measure a tensile, compressive, bending and/or shear strain of the component(s) to which it/they is/are mounted.

Figure 5:
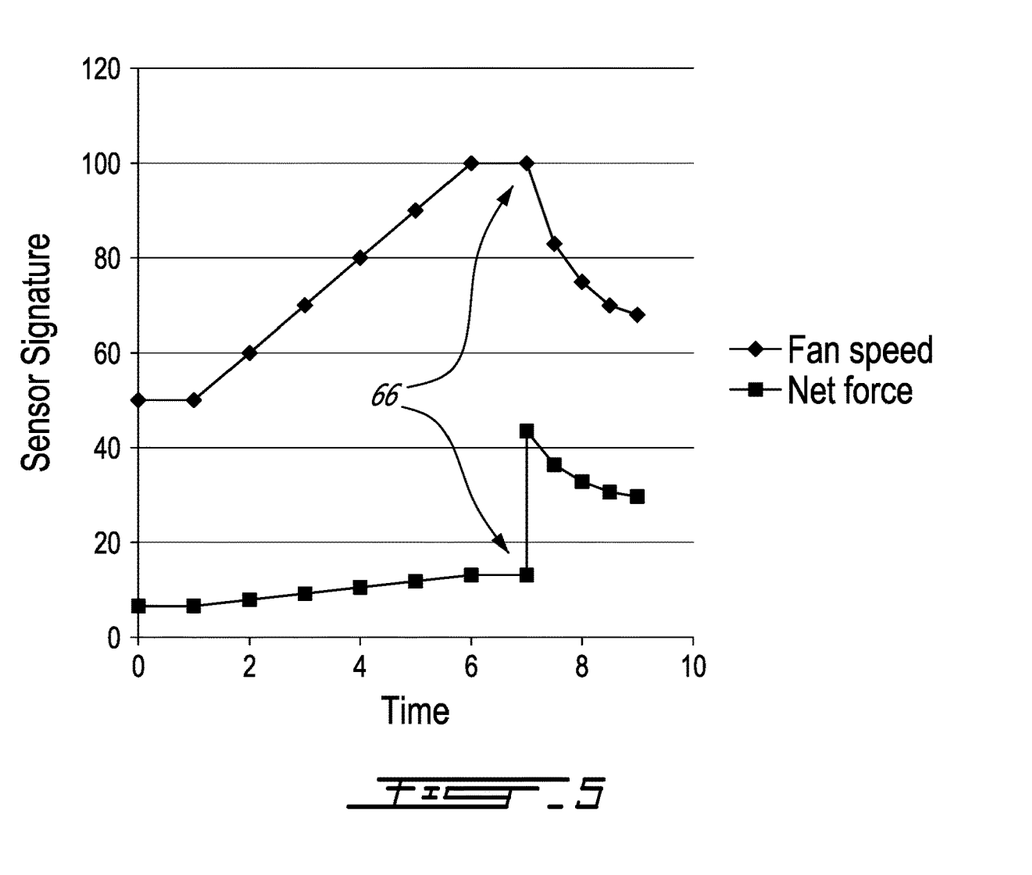
FIG. 5 is a graph showing a plot of an exemplary rotational speed of a fan of the spool of FIG. 2 and an exemplary axial force exerted by the shaft of the spool on a structure supporting the shaft.

FIG. 5 is a graph showing a plot of example speed sensor measurements of a rotational speed of fan 12 and a plot of example sensor measurement of net force 58 exerted by the low pressure shaft 30A on the support structure 46 before, during and after a shaft shear event. The horizontal x-axis of FIG. 4 is a time scale in seconds and the vertical y-axis has been normalised to show a maximum fan speed of 100 immediately prior to the shaft shear event. The moment of the shaft shear event is identified using reference character 66 in both plots and occurs around the seven (7) second mark.

The moment 66 of the shaft shear event is accompanied by a sudden and significant increase in the net force 58 (see FIG. 3) over a short period of time and can be detected using the sensor 42. In some embodiments, the expected change in the net force 58 may be predetermined (e.g., calculated) based on one or more known characteristics of the gas turbine engine 10. Alternatively the expected change in the net force 58 can be predetermined experimentally. In some embodiments, the predetermined change in the net force 58 may comprise a 50% or larger increase in the axial force exerted by the low pressure shaft 30A on the support structure 46. In some embodiments, the predetermined change in the net force 58 may comprise a 50% to 60% sudden increase in the axial net force 58 exerted by the low-pressure shaft 30A on the support structure 46. In some embodiments, the predetermined change in the net force 58 may comprise a 40% to 50% sudden increase in the axial net force 58 exerted by the low-pressure shaft 30A on the support structure 46. In some embodiments, the predetermined change in force may comprise a predetermined increase in an axial force exerted by the low pressure shaft 30A on the support structure 46 in less than a predetermined period of time.

Following a shaft shear event, the rotational speed of the fan 12 may begin to decrease as the fan 12 gradually loses its inertia since it is no longer being driven by the low-pressure turbine 32. However, unlike the signature of the net force 58 exerted by the low-pressure shaft 30A on the support structure 46, the signature of the rotational speed of the fan 12 is not as immediate and pronounced. Therefore, even though the shaft shear detection can be made by detecting a change in the rotational speed of the fan 12, such detection based on rotational speed may not be as fast a detection based on the signature of the net force 58.

Figure 6:
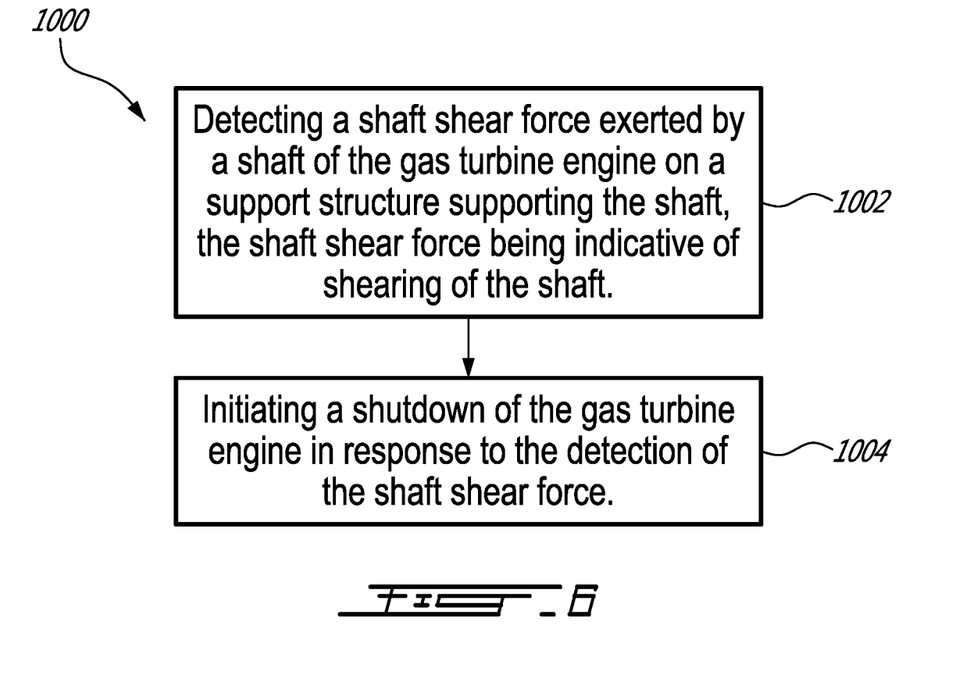
FIG. 6 is a flow chart illustrating an exemplary method for detecting a shaft shear event.

FIG. 6 is a flow chart illustrating an example method 1000 for detecting a shaft shear event in gas turbine engine 10. The method 1000 can be performed using the system 40 as described herein or using another suitable system. Aspects of the system 40 described above are also applicable to the method 100.

At block 1002, the method 1000 comprises detecting (e.g., using sensor 42) a shaft shear force (e.g., net force 58) exerted by the low-pressure shaft 30A (or other shaft) of the gas turbine engine 10 on the support structure 46 supporting the low pressure shaft 30A. The shaft shear force is indicative of shearing of the low-pressure shaft 30A.

At block 1004, the method 1000 comprises initiating a mitigating action such as a shutdown of the gas turbine engine 10 in response to the detection of the shaft shear force.

As explained above, in some embodiments of the method 1000, detecting the shaft shear force comprises detecting a predetermined change in force exerted by the low pressure shaft 30A of the gas turbine engine 10 on the support structure 46 as a function of time. The predetermined change in force may be based on one or more known characteristics of the engine 10.

The method 1000 or parts thereof may be conducted under the control of the controller 44 based on machine-readable instructions accessible to or stored within the controller 44. Accordingly, upon on the detection of the shaft shear event, the controller 44 may be configured to initiate a shutdown of the engine 10, such as by closing the fuel valve 48 for example.

The system 40 for detecting a shaft shear event as described herein may provide one or more advantages over conventional shaft shear detection systems. For example, the use of the sensor 42 (e.g., load cell, strain gauge) to detect a force signature may be relatively quick and less computationally intensive as other approaches. Accordingly, the detection of the shaft shear event and the initiation of an appropriate action may potentially be quicker than other methods. A quicker detection and mitigation of the shaft shear event (e.g., preventing or reducing the risk of a turbine burst) may, in some embodiments, permit reducing the margins in the design of structures or components of the engine 10 for burst and containment, which may in turn lead to a weight reduction of the engine 10.

Figure 7:
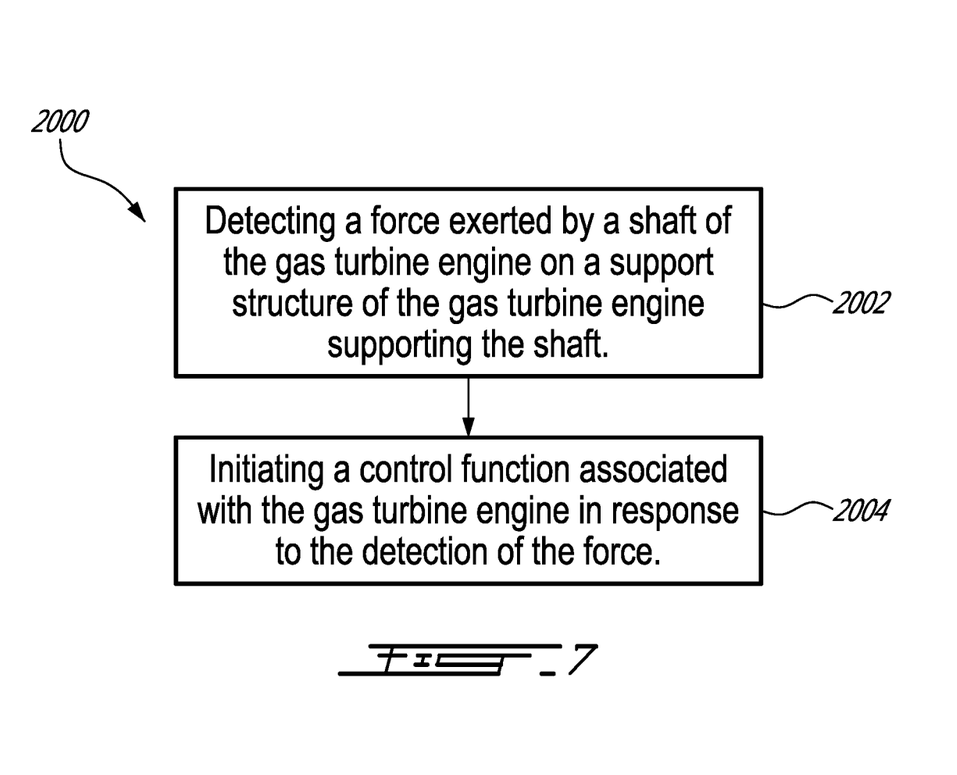
FIG. 7 is a flow chart illustrating an exemplary method for initiating a control function associated with the gas turbine engine of FIG. 1.

FIG. 7 is a flow chart illustrating an exemplary method 2000 for initiating a control function associated with gas turbine engine 10. The method 2000 can be performed using the system 40 as described herein or using another suitable system. Aspects of the system 40 described above are also applicable to the method 2000. The method 2000 or parts thereof may be conducted under the control of the controller 44 based on machine-readable instructions accessible to or stored within the controller 44. Force sensor 42 and controller 44 may be used to perform tasks other than or in addition to shaft shear detection in some embodiments. For example, at block 2002, the method 2000 comprises detecting (e.g., using sensor 42) a force (e.g., net force 58) exerted by the low-pressure shaft 30A (or other shaft) of the gas turbine engine 10 on the support structure 46 supporting the low pressure shaft 30A. At block 2004, the method 2000 comprises initiating a control function (e.g., using controller 44) associated with the gas turbine engine 10 in response to the detection of the force.

In some embodiments, the control function may comprise an adjustment of a thrust or power setting of gas turbine engine 10. For example, the net force 58 measured or detected may be indicative of an amount of forward axial force of the low-pressure shaft 30A produced by the fan 12 and may accordingly be indicative of a thrust or power output of the gas turbine engine 10. Therefore the use of the force sensor 42 may provide a suitable feedback signal for the purpose of controlling the thrust output of the gas turbine engine 10 via the controller 44 for example. In other words, the force sensor 42 may provide an indication of the amount of thrust produced by the fan 12 independently of the rotational speed of the fan 12.

In some situations, a change in the axial force detected by force sensor 42 may be indicative of an occurrence of damage to the fan 12 (e.g., blade damage) and consequently a loss of thrust produced by the fan 12 due to a loss in efficiency of the fan 12. Such damage could be due to a bird strike for example or other foreign object damage. The use of sensor 42 may therefore serve to detect such damage to the fan 12 by way of detecting a change (e.g., reduction) in the net force 58 for example. In some situations, following the detection of such damage, controller 44 may then initiate an increase in power setting (e.g., initiating an increase in fuel flow to combustor 16 via valve 48) to at least partially compensate for the reduction in efficiency of the fan 12 and at least partially restore the thrust output of the gas turbine engine 10. It is understood that different magnitudes of the change in axial force measured by the force sensor 42 may be correlated to different events and that different control functions may be initiated by the controller 44 in response to the detection of different events.

Figure 8:
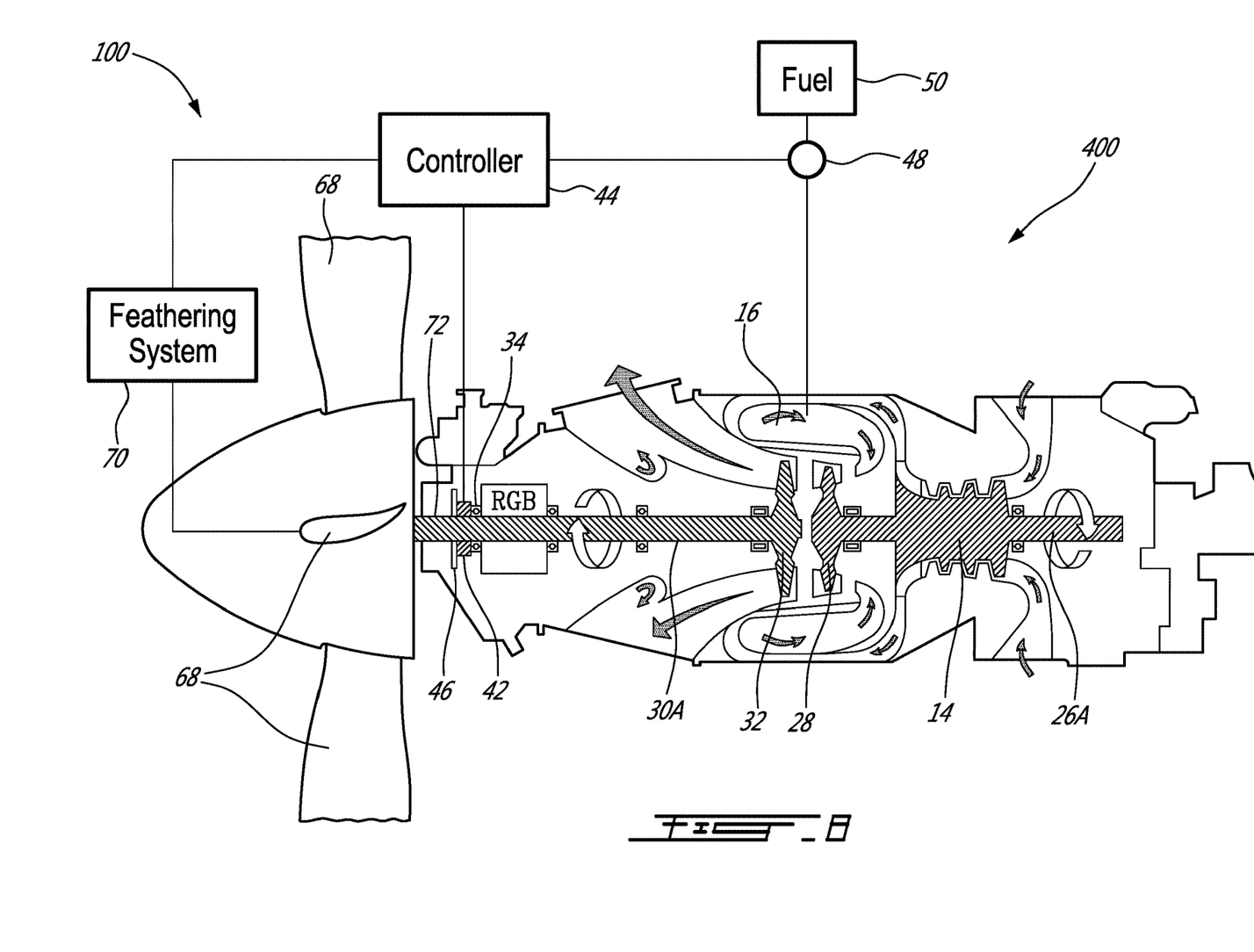
FIG. 8 is a schematic axial cross-sectional view of an exemplary turboprop gas turbine engine comprising a system for controlling a pitch angle of propeller blades.

FIG. 8 is a schematic axial cross-sectional view of an exemplary turboprop gas turbine engine 100 comprising a system 400 for initiating a control function associated with gas turbine engine 100. The system 400 includes components of the system 40 previously described above and like elements are identified using like reference numerals. The gas turbine engine 100 may be coupled to a propeller comprising blades 68. The gas turbine engine 100 may comprise a (e.g., auto-) feathering system 70 that serves to (e.g., automatically) feather the propeller blades 68 in some situations during flight of an aircraft to which the gas turbine engine 100 is mounted. The feathering system 70 may comprise one or more suitable actuators operatively coupled to change the pitch of the blades 68. The feathering system 70 may be operatively coupled to the controller 44 for receiving commands from the controller 44.

A feathered propeller has its blades 68 oriented to an extremely high pitch angle of approximately 90° so that they face perpendicular to the airstream and produce minimal aerodynamic drag. This may be done intentionally during a flight to decrease the drag on an airplane and, prevent windmilling of the propeller. This function can be done in an emergency situation in flight for example. Since a change in the pitch angle of the blades 68 of the propeller would produce a change in thrust produced by the propeller, the use of the force sensor 42 to measure an axial force transmitted to the structure 46 by the propeller shaft 72 can provide an indication of such change in thrust produced by the propeller in a manner analogous to indicating the change in thrust produced by the fan 12 of engine 10 as described above. The force sensor 42 can therefore provide useful and independent feedback on the operation of the feathering system 70 of the gas turbine engine 100. In some embodiments, the controller 44 may be configured to initiate a function of the feathering system 70 based at least in part on the axial force measured via the force sensor 42.

In addition, the axial force transmitted to the structure 46 by the propeller shaft 72 (or other shaft) can also be an indication of the an amount of torque on the propeller shaft 72. Accordingly, the use of the force sensor 42 can also provide an indication of the torque on a shaft independently of other torque sensors. In various embodiments, the axial force measured by force sensor 42 can be used by the controller 44 for initiating and carrying out various control functions in various situations.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for detecting a shaft shear event in a gas turbine engine having a turbine supported by a shaft, the system comprising:
   a sensor configured and located to detect a shaft shear force exerted by the shaft on a support structure of the gas turbine engine, the shaft shear force being indicative of shearing of the shaft and including a predetermined change in axial force exerted by the shaft of the gas turbine engine on the support structure as a function of time; and
   a controller operatively coupled to the sensor and configured to initiate a shutdown of the gas turbine engine in response to the detection of the shaft shear force by the sensor.

2. The system of claim 1, wherein the predetermined change in axial force comprises a 50% increase in the axial force exerted by the shaft of the gas turbine engine on the support structure in a predetermined period of time.

3. The system of claim 1, wherein the sensor comprises a load cell disposed in a load path between the shaft of the gas turbine engine and the support structure.

4. The system of claim 1, wherein the sensor comprises a load cell disposed in a load path between a thrust bearing supporting the shaft of the gas turbine engine and the support structure.

5. The system of claim 1, wherein the sensor comprises a strain gauge configured to detect a strain of the support structure in response to the shaft shear force exerted by the shaft of the gas turbine engine on the support structure.

6. A gas turbine engine comprising:
   a shaft having a first portion in torque-transmitting engagement with a load, and a second portion in torque-transmitting engagement with a turbine; and
   a sensor configured and located to detect a shaft shear force exerted by the shaft on a support structure supporting the shaft, the shaft shear force being indicative of shearing of the shaft at a location axially between the first and second portions of the shaft, the shaft shear force including a predetermined change in axial force exerted by the shaft of the gas turbine engine on the support structure as a function of time; and
   a controller operatively coupled to the sensor and configured to initiate a shutdown of the gas turbine engine in response to the detection of the shaft shear force by the sensor.

7. The gas turbine engine of claim 6, wherein the predetermined change in axial force comprises a 50% increase in the axial force exerted by the shaft of the gas turbine engine on the support structure in a predetermined period of time.

8. The gas turbine engine of claim 6, wherein the sensor comprises a load cell disposed in a load path between the shaft of the gas turbine engine and the support structure.

9. The gas turbine engine of claim 6, wherein the sensor comprises a load cell disposed in a load path between a thrust bearing supporting the shaft of the gas turbine engine and the support structure.

10. The gas turbine engine of claim 6, wherein the sensor comprises a strain gauge configured to detect a strain of the support structure in response to the shaft shear force exerted by the shaft of the gas turbine engine on the support structure.

11. A method for detecting a shaft shear event in a gas turbine engine, the method comprising:
    detecting a shaft shear force exerted by a shaft of the gas turbine engine on a support structure supporting the shaft, the shaft shear force being indicative of shearing of the shaft and including a predetermined change in axial force exerted by the shaft of the gas turbine engine on the support structure as a function of time; and
    initiating a shutdown of the gas turbine engine in response to the detection of the shaft shear force.

12. The method of claim 11, wherein the predetermined change in axial force comprises a 50% increase in the axial force exerted by the shaft of the gas turbine engine on the support structure in a predetermined period of time.

13. The method of claim 11, comprising detecting the shaft shear force using a load cell disposed in a load path between a thrust bearing supporting the shaft of the gas turbine engine and the support structure.

14. The method of claim 11, comprising detecting the shaft shear force by detecting a strain of the support structure in response to the shaft shear force exerted by the shaft of the gas turbine engine on the support structure.

15. A system comprising:
    a sensor configured and located to detect an axial force exerted by a shaft of a gas turbine engine on a support structure of the gas turbine engine supporting the shaft; and
    a controller operatively coupled to the sensor and configured to initiate a control function associated with the gas turbine engine in response to the detection of the axial force by the sensor.

16. The system of claim 15, wherein the axial force is indicative of an operation of a feathering system for a propeller coupled to the gas turbine engine.

17. The system of claim 15, wherein the control function comprises an adjustment of a thrust or power setting of the gas turbine engine.

18. The system of claim 15, wherein:
    the change in axial force is indicative of an occurrence of damage to a fan coupled to the shaft; and
    the control function comprises an adjustment of a thrust or power setting of the gas turbine engine.

19. The system of claim 15, wherein the sensor comprises a load cell disposed in a load path between the shaft of the gas turbine engine and the support structure.

20. The system of claim 15, wherein the sensor comprises a load cell disposed in a load path between a thrust bearing supporting the shaft of the gas turbine engine and the support structure.

21. The system of claim 15, wherein the sensor comprises a strain gauge configured to detect a strain of the support structure in response to the axial force exerted by the shaft of the gas turbine engine on the support structure.

22. A method comprising:
    detecting an axial force exerted by a shaft of a gas turbine engine on a support structure of the gas turbine engine supporting the shaft; and
    initiating a control function associated with the gas turbine engine in response to the detection of the axial force.

23. The method of claim 22, wherein the force is indicative of an operation of a feathering system for a propeller coupled to the gas turbine engine.

24. The method of claim 22, wherein the control function comprises an adjustment of a thrust or power setting of the gas turbine engine.

25. The method of claim 22, wherein:
    the change in axial force is indicative of an occurrence of damage to a fan coupled to the shaft; and
    the control function comprises an adjustment of a thrust or power setting of the gas turbine engine.

26. The method of claim 22, wherein the axial force is in a load path between the shaft of the gas turbine engine and the support structure.

27. The method of claim 22, wherein the axial force is in a load path between a thrust bearing supporting the shaft of the gas turbine engine and the support structure.

28. The method of claim 22, comprising detecting the axial force by detecting a strain of the support structure in response to the axial force exerted by the shaft of the gas turbine engine on the support structure.

* * * * *